United States Patent [19]
Sukup

[11] 3,714,718
[45] Feb. 6, 1973

[54] CONTROL SYSTEM FOR GRAIN DRYING BIN
[76] Inventor: Eugene G. Sukup, Sheffield, Iowa
[22] Filed: March 18, 1971
[21] Appl. No.: 125,672

[52] U.S. Cl. ................................................34/56
[51] Int. Cl. ...........................................F26b 13/12
[58] Field of Search.214/17 CA, 17 D, 17 DA; 34/56

[56] References Cited
UNITED STATES PATENTS

| | | | |
|---|---|---|---|
| 3,532,232 | 10/1970 | Sukup | 214/17 DA |
| 3,404,467 | 10/1968 | Burghard | 34/56 |
| 3,429,053 | 2/1969 | Behlen et al | 34/56 |
| 3,365,812 | 1/1968 | Borrow | 214/17 D X |

Primary Examiner—Robert G. Sheridan
Attorney—Albert H. Pendleton et al.

[57] ABSTRACT

A control system for grain drying bins of the type adapted to receive wet grain, remove moisture from the grain by the passage of heated air therethrough, and discharge dried grain. A portion of the heated air passing through the grain in the bin escapes through the grain discharge means, and the humidity of this escaping air is indicative of the moisture content of the grain being discharged. A humidity measuring device capable of controlling the on-off operation of the grain discharge means is located near the dried grain discharge outlet and is set to cause the discharge means to operate when the humidity of the air passing it is below a preselected level.

11 Claims, 2 Drawing Figures

PATENTED FEB 6 1973

3,714,718

INVENTOR
EUGENE G. SUKUP
BY
Henderson + Strom
ATTORNEYS

DESCRIPTION OF THE PREFERRED EMBODIMENT

Referring now to the drawings, and more particularly to FIG. 1, a grain drying bin 10 is shown having a circular sidewall 11 and a conically shaped roof 12 having a rim 13 forming an opening in the apex of the roof 12. The bin 10 has a floor 14 pervious to gas flow mounted on supports 15 above a foundation 16. A plenum chamber 17 is formed between the floor 14 and foundation 16 and enclosed by the lower portion of sidewall 11. A blower-furnace 18 is provided with duct 19 extending to plenum chamber 17.

Sweep augers 24 are shown extending radially from the center of the bin and just above the bin floor 14. They are adapted to rotate about their own axes, and to sweep across the bin floor, thereby uniformly feeding dried grain from the bin floor into the sump 20. The sweep augers 24, and the operation thereof, are described in detail in my U.S. Pat. No. 3,532,232, and such description is herein incorporated by reference.

As shown more clearly in FIG. 2, sump 20 is formed at the center of floor 14 for receiving dried grain from floor 14, and a screw conveyor including an auger 22 and a housing 23 extends from the sump 20 to the exterior of the bin.

Discharge conveyor housing 23 is shown extending exterior of the bin 10, and the shaft 28 of auger 22 is shown extending beyond housing 23, through housing extension 29, and into drive machinery housing 30. Drive machinery housing 30 contains a motor and drive means (not shown) for turning the shaft 28.

Referring to FIG. 2, a humidity sensor 31, capable of responding to a preselected humidity level of its surrounding atmosphere and operating a switch in response thereto, is shown mounted in the upper portion of housing extension 29. A control knob 32 is shown mounted exterior of the housing extension 29 for the operator's convenience in setting the desired moisture level on the humidity sensor 31. Conduit 33 extends from the humidity sensor 31 to the drive machinery housing 30, and there is connected to the drive machinery on-off control such that the drive machinery responds to the humidity sensor.

Referring to FIGS. 1 and 2, heated drying gas passes from blower-furnace 18 through duct 19 into chamber 17 and passes through the floor 14 and percolates upward through the grain to be dried (not shown), and eventually exits the bin through roof opening 13. Sump wall 34 is impervious to gas from plenum chamber 17, but as will be obvious, part of the drying gas, after passing through floor 14, will bleed out via sump 20 and conveyor housing 23 past humidity sensor 31 and out to the atmosphere. This gas has a moisture content which is indicative of the dryness of the grain about to be discharged from conveyor housing 23, due to its intimate contact with such grain, and for this reason a humidity sensor located in the manner provided by this invention provides much better control than a humidity sensor located otherwise, such as inside the bin.

As shown in FIG. 2, humidity sensor 31 is mounted through housing extension 29 such that the sensing element (not shown) extends into the housing extension 29 so as to be in direct contact with air passing out of the discharge. The housing extension 29 may be, for example, of flexible material which can be wrapped over the end of the conveyor housing 23 and clamped thereon by fasteners 36.

In operation, a batch of grain to be dried is loaded into bin 10 through the opening 13 in the roof thereof. Heated, dry air is introduced from blower-furnace 18 through duct 19 into plenum chamber 17. The heated, dry air passes through the pervious floor 14, percolates upward through the grain and out the roof opening 13. A portion of this air, which initially will quickly attain a high humidity level, will bleed out via the sump 20 and conveyor housing 23 past humidity sensor 31 and to the outside atmosphere. As the grain nearest the bin floor reaches the desired level of dryness, the moisture content of the air bleeding out through sump 20 and conveyor housing 23 will possess a moisture content corresponding to the particular level of grain dryness. The humidity sensor 31 will respond to the lowered moisture content of air passing it, and will send a signal to the drive machinery control activating the grain discharge. So long as the moisture content of the air passing the humidity sensor 31 does not exceed the preset level, the discharge will continue to operate. During this period it may be desirable to feed additional wet grain into the bin. With proper operation, it is possible to continuously feed wet grain in the top and discharge dried grain from the discharge. The cap 35 prevents wet grain from falling directly into the sump 20, and preferably some means, such as sweep augers 24, are provided to feed the grain from the bin floor to the sump 20 in response to operation of the discharge conveyor.

If for any reason, such as furnace breakdown or introduction of an especially wet load of grain, the moisture content of the air passing through sump 20 and conveyor housing 23 exceeds the level set on humidity sensor 31, the sensor will detect this and cause the discharge conveyor to stop, preventing discharge of wet grain. When the moisture content of air passing sensor 31 again drops below the level set on the sensor, the sensor will cause the discharge to resume operation in response to a signal therefrom.

A specific preferred embodiment of a control system for a grain drying bin, and the operation thereof, has been described, but it is understood that various alterations and modifications could be made thereto without departing from the invention.

I claim:

1. In combination with apparatus for drying grain or like material including a compartment for the material being dried, means for passing drying gas into said compartment and through such material in said compartment, means defining a primary passage for normal removal of such gas from said compartment after passage through such material, means for conveying dried material from a portion of said compartment, said means for conveying dried material being in fluid communication with said compartment and forming a path for escape of a portion of such gas through said conveying means, and means for operating said conveying means for controlled removal of such material from said portion of said compartment; the improvement comprising a control system including sensing means positioned to sense the condition of such gas escaping through said conveying means and capable of activating a control in response to a preselected condition of

CONTROL SYSTEM FOR GRAIN DRYING BIN

BACKGROUND OF THE INVENTION

This invention relates to a system for controlling the moisture content of dried grain being discharged from a grain drying bin, and particularly to a system for detecting a desired humidity level in air passing out of a grain drying bin with the dried grain, and controlling the on-off operation of the grain discharge by reference thereto.

One popular form of grain drying bin for reducing the moisture content of granular material includes a foundation and an upstanding circular wall having a conically shaped roof. A floor pervious to gas flow is supported above the foundation, and forms a plenum chamber between the foundation and the floor. Heated air is introduced into the plenum chamber and passes through the pervious floor up into the wet grain, and eventually up through the body of wet grain and out through an opening in the top of the bin. A pit or sump is provided, generally at the center of the grain drying bin, and a screw conveyor or other suitable means discharges dried grain from the sump to the exterior of the bin. One popular form of grain drying bin of this type is described in U.S. Pat. No. 3,532,232, and includes a plurality of radially extending sweep augers disposed adjacent the bin floor and rotatable about their own axes to engage and feed the grain adjacent the floor to a central sump. A screw conveyor discharges dried grain from the sump to the exterior of the bin, and an interconnected drive unit rotates the sweep auger to facilitate even discharge of dried grain into the sump and out the discharge.

Several schemes have been used to control the operation of this type grain drying bin such that only grain having a desired moisture content is discharged. As is well known, storage capabilities of grain are reduced if the moisture content is too high, and on the other hand, over drying can result in possible damage due to overheating and also results in increased time and cost of drying.

One type of control for this type of bin involves using a temperature control placed inside the bin. The temperature of the grain is indicative of the moisture content. When the temperature sensor detects a preselected temperature, it activates the discharge device and withdraws dried grain from the bin. This type of control has generally been unsatisfactory, as it is not precise enough for most operations due to lack of repeatable correlation between temperature at the measuring point and moisture content of discharging grain. Another type of control that has been tried involves a humidity sensor mounted in the side of the bin. When the air passing over the humidity sensor reaches a certain pre-determined humidity level, the discharge is turned on as in the case of a temperature control. Again, this system has not been completely satisfactory for the reason that when the dry grain has been removed a batch of wet grain drops down to the area of the humidity sensor, and the sensor then causes the discharge to shut off, and the discharge will not operate further until the grain around the sensor is dry. This causes undesirable delays in the operation in that the grain below the humidity indicator may be dry enough to be removed, but the discharge is not able to operatue due to the humidity sensor having shut off the discharge. Occassionally this can lead to overdrying of the grain and resultant damage thereto.

SUMMARY OF THE INVENTION

This invention relates to a system for controlling the operation of a grain drying bin, and more particularly to a system for controlling the operation of a grain drying bin of the type which provides heated air passing through a previous floor and up through a body of wet grain and out through the top of the drying bin. The dried grain is collected through a sump and then discharged out to the exterior of the grain bin. A humidity sensor is placed near the outlet of the discharge means for measuring the humidity of air escaping therefrom. This air escapes due to the fact that the main body of the grain drying bin through which heated air is being passed is in fluid communication with the discharge means via the sump formed in the floor, and a certain amount of air therefore escapes through this discharge means. The discharge means is responsive to a signal from the sensor, and operates when the humidity level of the air passing over the sensor is below a preselected level set in the sensor. If the moisture content of air passing the sensor rises above the preselected level, the discharge means is stopped until such time as the moisture content again drops below the preselected level.

The sensor may be, for example, an instrument of a type readily available which is capable of operating an electrical switch when the humidity of air passing over it is above or below a certain preselected level. The preselected level is preferably adjustable by a control included with the sensor.

It is an object of this invention to provide a novel means for controlling the operation of a grain drying bin.

It is another object of this invention to provide an improved control system for grain drying bins which enables grain to be dried more quickly and more accurately than has heretofore been possible.

It is still another object of this invention to provide an improved control system for grain drying bins which allows grain to be discharged therefrom only when the grain being discharged is at a preselected level of dryness.

It is a further object of this invention to provide a control system for grain drying bins which measures the humidity of air passing over grain near the outlet of the grain discharge means and allows the discharge means to operate only when the moisture content of this air is below a preselected level.

Figure 1:
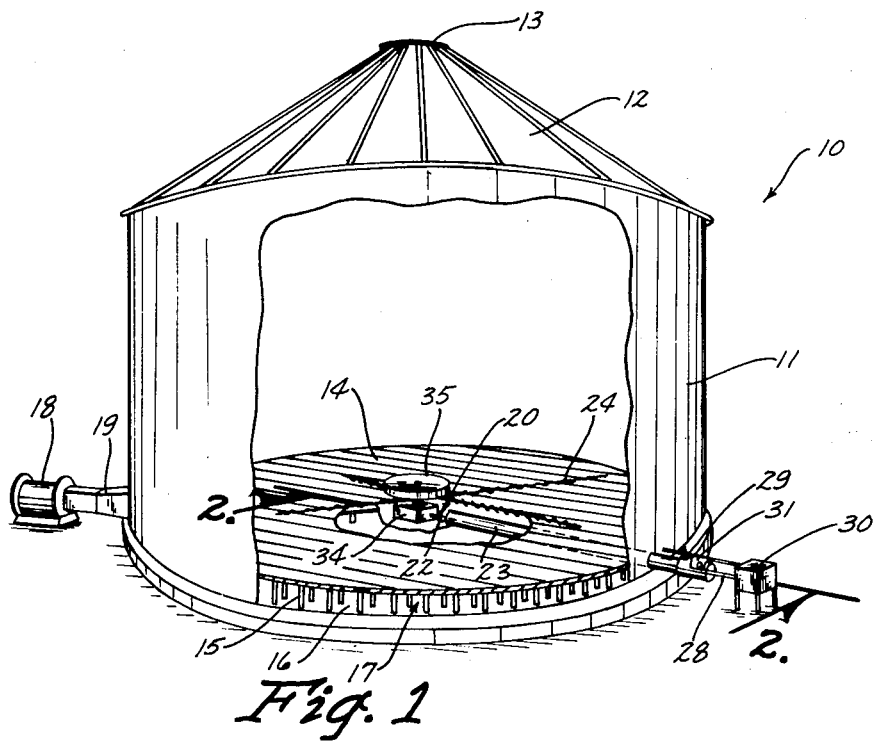
FIG. 1 is a perspective view, partly cut away, showing a grain drying bin equipped with the control system of this invention.
Figure 2:
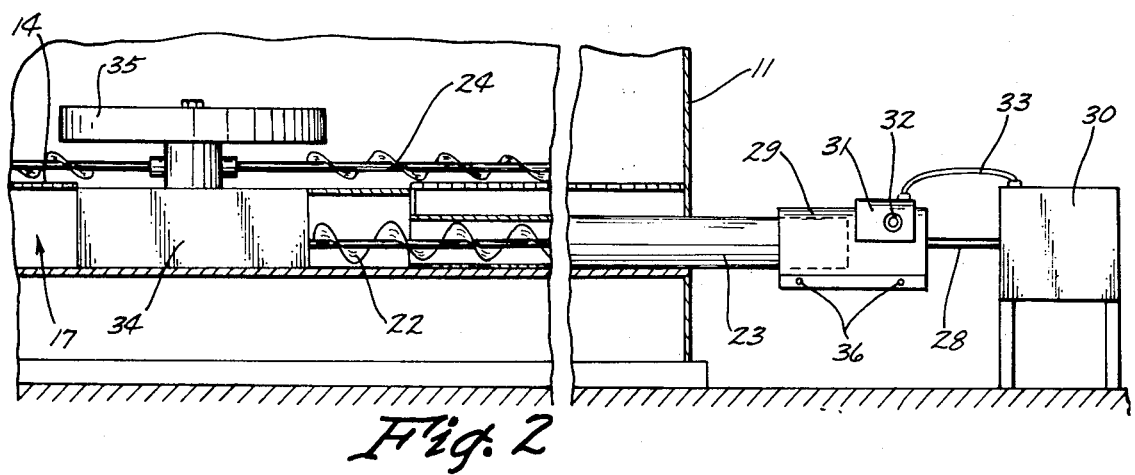
FIG. 2 is an enlarged side elevational view, partially cut away, illustrating the control system of this invention.

such escaping gas, and wherein said means for operating said conveying means includes such a control responsive to said sensing means, to convey such dried material from said portion of said compartment in response to the condition of said escaping gas in said conveying means.

2. Apparatus as in claim 1 wherein said sensing means comprises humidity sensing means.

3. Apparatus as in claim 1 wherein said conveying means includes a housing and a conveyor member in said housing, and said sensing means is positioned adjacent the discharge end of said housing.

4. In combination with a grain drying bin of the type having a gas pervious floor and a subjacent plenum chamber for distributing drying gas into a grain drying compartment in said bin and having an opening for normal removal of such gas from said compartment, means for conveying dried grain from a portion of said compartment, wherein said means for conveying dried grain is in fluid communication with such grain drying compartment for escape of a portion of such gas through said conveying means, the improvement comprising a control system including sensing means positioned to sense the condition of such escaping gas in said conveying means and capable of activating a control in response to a preselected condition of such escaping gas therein, and control means responsive to said sensing means for operating said conveying means, to convey such dried grain from said portion of said compartment through said conveying means in response to the condition of such gas in said conveying means.

5. A combination as in claim 4 wherein said conveying means includes a housing and a conveyor member in said housing, and said sensing means includes humidity sensing means for sensing the humidity of such gas escaping through said housing.

6. A combination as in claim 5 wherein said conveying means includes a sump extending downwardly from said floor and defined by side walls impervious to gas, said housing and conveyor member extending from said sump to the exterior of said bin, for discharging such grain from said compartment, and said sensing means being positioned exterior to said compartment.

7. A combination as in claim 6 wherein said conveyor member is an auger, and including an extension attached to the discharge end of said housing, said sensing means being mounted in the upper part of said extension.

8. A combination as in claim 6 including means for feeding grain from near said bin floor into said sump.

9. A combination as in claim 8 wherein said sump is located centrally of said floor and said means for feeding grain includes a plurality of augers extending parallel to and just above said pervious floor, said augers being adapted to rotate about their own axes and to sweep across said bin floor in response to operation of said discharge means.

10. A control system for drying of grain or like material in apparatus including a compartment for such material being dried, means for passing drying gas into said compartment and through such material in said compartment, means defining a primary passage for normal removal of such gas from said compartment after passage through such material, and means for conveying dried material from a portion of said compartment, wherein said means for conveying dried material is in fluid communication with said compartment and forms a path for escape of a portion of such gas through said conveying means, comprising sensing means positioned to sense the condition of said escaping gas in said conveying means and capable of activating a control in response to a preselected condition of said escaping gas, and control means responsive to said sensing means for operating said conveying means, to convey such dried material from said portion of said compartment through said conveying means in response to the condition of said gas in said conveying means.

11. A control system as in claim 10 wherein said compartment is provided with a gas pervious floor and a subjacent plenum chamber for distributing drying gas into grain or the like in said compartment over said floor, said means for conveying dried material including a sump and a conveyor including a housing extending from said sump for discharging grain from said compartment, means for feeding grain from near said floor into said sump, and said sensing means comprising humidity sensing means responsive to the humidity of said escaping gas in said conveyor housing.

* * * * *